W. L. COLE.
METAL PLATE CONSTRUCTION AND PROCESS OF MAKING SAME.
APPLICATION FILED JULY 21, 1917.

1,290,091. Patented Jan. 7, 1919.

INVENTOR.
William Lawes Cole,
by
Kenyon & Kenyon,
his attorneys

UNITED STATES PATENT OFFICE.

WILLIAM LAWES COLE, OF EAST LONDON, ENGLAND, ASSIGNOR TO QUASI-ARC COMPANY, LIMITED, OF LONDON, ENGLAND.

METAL-PLATE CONSTRUCTION AND PROCESS OF MAKING SAME.

1,290,091.    Specification of Letters Patent.    Patented Jan. 7, 1919.

Application filed July 21, 1917. Serial No. 181,975.

*To all whom it may concern:*

Be it known that I, WILLIAM LAWES COLE, a subject of the King of England, and residing at 23 Clinton road, Mile End, East London, England, have invented certain new and useful Improvements Relating to Metal-Plate Constructions and Processes of Making Same, of which the following is a specification.

This invention relates to metal plate construction and method of making same; it is the object of the invention to provide a construction wherein metal plates are welded together, the construction being adapted to be employed in metal plating work generally, for example in the building of ships, boilers, tanks, metal walls and so forth.

It is well known how to deposit welding metal by the employment of fusible electrodes, using the electric arc or quasi-arc process, and how to make a joint between two metal objects by depositing a line or fillet of welding metal at the edges or surfaces of contact between such objects. It might have been assumed therefore that no difficulty existed in welding together plates for example by chamfering their edges and depositing welding metal there. Joints made in this way under favorable conditions may be approximately as strong as the metal of the plates themselves in so far as resistance to simple tensile stresses is concerned, but their resistance to bending and other stresses is not so good. In some cases however, for instance in ship construction, resistance to bending stresses and to alternating or vibratory stresses, is of great importance, and no method of making joints which leaves a weakness in this respect can be used to any considerable extent in practice.

In the welded plate construction forming the subject of the present invention, the welding is carried out in such a way that a portion of the metal at the joint is permanently stressed in one direction while another portion is oppositely stressed, the joint then presenting a structure such that it is stronger to resist all forms of stressing than the plates adjacent the joint.

The invention is illustrated in the accompanying drawings, wherein:—

Figure 1:
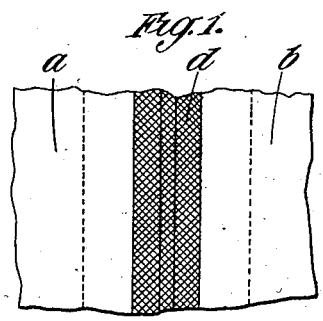
Figure 1 shows a view of one form of joint as seen from one face.
Figure 3:
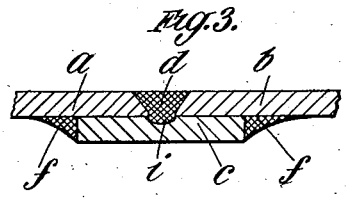
Figs. 3, 4 and 5 are cross sections of various forms of the joint.
Figure 4:
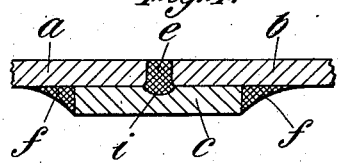
Figure 2:
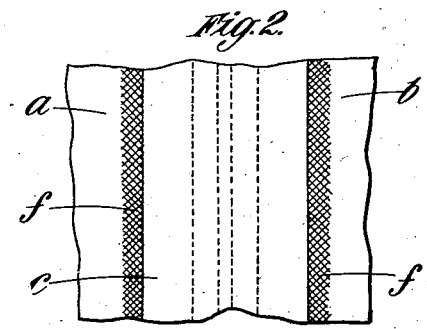
Fig. 2 shows the opposite face of the joint.
Figure 5:
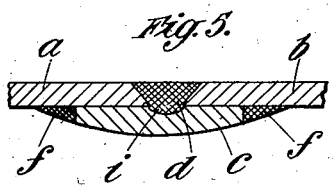

In each of the figures, $a$ and $b$ represent portions of two plates to be welded together. Their edges may be chamfered as in Figs. 3 and 5, or left plain as in Fig. 4, and are placed nearly abutting in either case, but so as to leave a sufficient gap for manipulating a welding electrode between them for depositing metal there, or for effecting a weld by any other process such as that using the oxy-acetylene flame with a strip of metal to be deposited. In the case of the joints shown in Figs. 1 to 5, a butt-strip $c$ of metal, preferably the same metal as that of the plates, is laid over the joint line so as to lap approximately equally over both plates. It is first preferably "tacked" in position by small deposits of welding metal near the ends and at a few other positions if required, according to the length of the strip, and then a welded joint is built up as at $d$, Figs. 1, 2, 3 and 5, or at $e$, Fig. 4, preferably by using welding electrodes, and depositing metal usually in two or three layers until the gap is filled up solidly. Its surface may be left rough, or filed down as shown in the sectional views. The welding deposited $d$ or $e$ not only welds the plates $a$ and $b$ together, but also welds the butt-strip $c$ to the plates along its middle line, as indicated by the shading at $i$ in the sectional views. Lines or fillets of welding metal $f$ are then deposited along each edge of the butt strip $c$, welding it to the plates. Owing to the fact that the mass of the strip $c$ is much less than that of the plates $a$ and $b$, it attains a higher temperature during the welding than the plates attain, with the result that it is more expanded than the corresponding width of the plates, and on cooling, each half of the butt-strip $c$ tends to contract more than the parts of the plates $a$ and $b$ against which it lies; the strip $c$ is therefore in tension when cold while the abutting edges of the plates $a$ and $b$ are in compression at the joint. The cooling of the fillets $f$ of welding metal also tends to produce the same state of tension and compression. The differences in expansion and contraction may be small, but they are sufficient to insure that the stresses are disposed as stated, and that they are never reversed in direction as compared with what is stated above, when the welding joint has cooled. Such a joint can be made stronger to resist tensile stresses than are the plates themselves—a condition which it is impossible to attain for example with a riveted joint—and even if the butt-strip is only of about half the gage of the plates, the resistance to bending of the joint across the butt-strip may be approximately double that of a plate tested by itself. The joint presents a structure which is so strong and rigid that there is no risk of its breakdown under alternating or vibratory stresses such as it is likely to be subjected to in practice.

The butt-strip $c$ may be a strip of metal of the same thickness as that of the plates, or of any required gage in relation to that of the plates. A particularly suitable form of the butt-strip is that shown in Fig. 4 wherein it is thinner at its edge than at the middle, the strip thus having an outwardly curved or rounded back in cross section. There is then a gradual increase in section from the fillets $f$ of welding metal at its edges up to the middle joint line.

When a plate-construction is made up in this way, with the welded butt-strips $c$ all on one side of the plating, the other surface of the plating can be substantially smooth or flat, all the joints being filled with deposits of welding metal. The smooth surface for example may be the outer plating of a ship, strengthened by the butt-strips $c$ on its inner surface so as to resist effectively all stresses to which the plating is likely to be subjected.

It will be seen that the method of building up the structure eliminates the necessity for any rivet holes or riveting work, while the joints will require no calking or other attention to render them water or oil-tight, and there is nothing to deteriorate or change in the joints when once they are made.

The avoidance of calking alone is a great saving of expense and trouble, not only in the first cost, but in cost for renewal from time to time afterward, in any structure required to be fluid-tight. A joint made as hereinbefore described can never work loose or creak due to movements under alternating stresses as riveted joints are liable to do.

Figure 6:
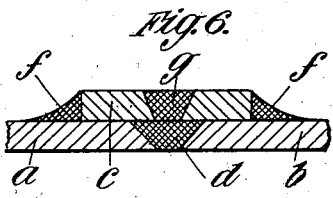
Fig. 6 is a cross section.
Figure 7:
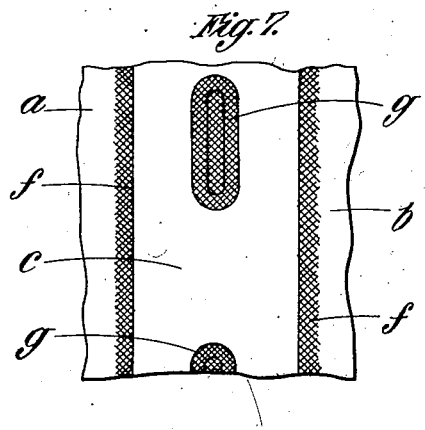
Fig. 7 is a face view of another form of joint.

The method of making the joints can be modified for example by welding the joint line between the plates $a$ and $b$ before the butt-strip is applied, then applying the butt-strip $c$, and welding it to the joint line by making welding deposits through holes or slots along the middle line of the strip; the edges of the butt-strip $c$ are then welded to the plates by fillets $f$ as before. If it is required to have the edges of the plates chamfered in the opposite direction to that which has been first described, that is to say with the wide side of the V-gap at the same side as that at which the butt-strip $c$ is to be applied, the plates must be welded first, the welding deposit being smoothed off if required, and then the butt-strip $c$ must be applied and welded through slots or notches along its center line before the edges of the strip are welded to the plates by fillets $f$. This is shown in Figs. 6 and 7 wherein $g$ represents deposits of welding metal made in slots cut at intervals along the center line of the butt-strip.

Figure 8:
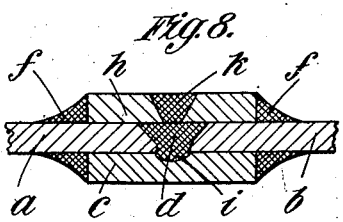
Fig. 8 shows a section of another form of joint.

Butt-strips can be welded to the plating at both sides if desired. This is shown in Fig. 8, wherein $c$ is a butt-strip welded for example as in Figs. 1 and 3, while $h$ is a second strip welded along its center line as at $k$ in slots, and welded at its edges by fillets $f$ to the plates $a$ and $b$.

In all of the examples hereinbefore described, it is assumed that the fillets $f$ at the edges will be continuous fillets of welding metal, of approximately the same thickness throughout their length. If required however they may be made thicker or stronger by additional deposits at intervals, or the fillets may be intermitted at intervals if this is desirable for any particular reason.

In all of the cases described and illustrated, the butt-strip tends to be normally in tension and the edges of the plates $a$ and $b$ in compression for the reason stated, although of course when the joint is subjected to a sufficiently strong transverse tensile stress, the extension in the butt-strip will allow a part of this stress to be borne by the joint at $d$ or $e$ also.

All of the welding operations will preferably be done by electric welding with the use of electrodes covered with blue asbestos yarn and worked according to the quasi-arc process, that is to say with the end of the electrode held close to the work so that it is a spluttering or quasi-arc which passes; the best electrodes to use for the purpose are those described in the specification of Patent No. 1,144,390. The invention is not limited however to the use of any particular electrodes for forming the welded joints, nor to any particular welding process.

Having now particularly described and ascertained the nature of my said invention and in what manner the same is to be performed, I declare that what I claim is:—

1. The method of forming welded plate joints which consists in welding the plates together at the joint, placing a butt strip across the joint and welding the butt strip to the metal joining the plates at intervals at points inside the area defined by the edges of the strip, and welding the edges of the strip to the plates.

2. The method of forming welded plate joints which consists in welding the plates at the joint, placing a butt strip across the joint, welding the strip to the plates along its edges and to the metal connecting the plates at points inside the edges.

3. The method of welding two plates together, which consists in welding across the joint a butt strip while it is heated to a higher temperature than the plates.

4. The method of welding together two plates which consists in chamfering the edges of the plates and placing them adjacent each other, filling the spaces so formed with fused metal, attaching a butt strip over the joint by fillet welding it to the plates along its edges and to the metal connecting the plates at points inside the area defined by the edges.

5. The method of welding together two plates which consists in fillet welding the plates together, attaching a butt strip over the joint by welding along its edges and at intervals in the area defined by the edges.

6. The method of welding two plates together which consists in fillet welding the plates together at the joint, attaching a butt strip over the joint on one side of the plates by welding along its edges to the plates and at intervals within the area defined by its edges, and similarly attaching another butt strip over the joint on the other side of the plates.

7. The method of welding two plates together which consists in fillet welding together the two plates, attaching a butt strip over the joint by welding it to the plates along its edges and by welding at intervals the butt strip to the fillet of the joint between the plates.

8. A welded joint between two metal plates comprising the plates, a section of fused metal connecting the plates, a butt strip and fused metal connecting the edges of the butt strip to the plates, and fused metal at intervals inside the edges and connecting the strip to the metal connecting the plates.

9. A joint between two plates comprising the two plates, a fillet of fused metal between the edges of the plates, a butt strip over the fused metal, and one edge of the strip welded to one plate and the other edge welded to the other plate and patches of fused metal weldably joining the strip to the fillet at intervals.

10. The method of forming welded plate joints which consists in welding together the plates by a deposit of welding metal, overlapping the joint by a butt strip, welding the butt strip at intervals along its center line to the joint line between the plates and uniting the strip to the plates by fillets of welding metal deposited along the edges of the strip.

11. The method of forming welded plate joints which consists in placing the plates close together, applying a butt strip across the joint and filling the space defined by the plates and the butt strip with a deposit of welding metal and subsequently welding the edges of the strip to the plates.

12. The method of forming welded plate joints which consists in welding plates together by a deposit of welding metal, then applying a butt strip over the joint, welding the strip by the metal deposit to the plates through slots in or near its center line and connecting the edges of the strip to the plates by fillets of welding metal.

13. The method of forming a welded joint comprising the plates to be welded and a strip of metal across the joint, which consists in heating the strip to a temperature different from that of the plates and welding while so heated thereby permanently stressing some of the metal of the joint in one direction and permanently stressing another part of the metal of the joint in a different direction.

14. The method of forming welded plate joints, which consists in placing the edges of the plates to be welded adjacent one another disposing a butt strip on the plates and across the joint line, welding the plates and the butt strip together, and fillet welding the butt strip to the plates along its edges.

15. A method of forming welded plate joints, consisting in disposing two plates to be joined with their edges adjacent one another, applying a butt-strip of metal overlapping the joint line, depositing welding metal between the adjacent edges of the plates and between the middle portion of the butt-strip and said plates, and subsequently depositing welding metal to form fillets along both of the edges of the butt-strip uniting said strip to the plates while heating the welding metal to a welding temperature in each instance, whereby a joint is formed having the fillets and the butt-strip in tension when cold, and the butt joint including the plate edges in compression.

16. A method of forming welded plate joints, consisting in chamfering the edges of the plates to be joined and disposing said plates with their chamfered edges adjacent one another, applying a butt-strip of metal overlapping the joint line, depositing welding metal at the joint line in such manner as to weld the middle portion of the butt-strip to the plates and to fill up the space between the chamfered plate edges, and subsequently depositing welding metal to form fillets along both of the edges of the butt-strip uniting said strip to the plates while heating the welding metal to a welding temperature in each instance, whereby a joint is formed having the fillets and the butt-strip in tension when cold, and the butt joint between the plate edges in compression.

17. A welded plate construction comprising two plates, a deposit of welding metal applied between two adjacent edges of said plates, a butt-strip overlapping the joint line between said plates and united thereto by welding metal at its middle portion, and fillets of welding metal applied at each edge of the butt strip uniting it to the said plates, said fillets being in tension when cold while the joint between the adjacent plate edges is in compression.

18. The method of stressing the parts of a welded joint in which there is a butt strip lapping the joint, which consists in heating said strip to a temperature different from that of the plates being welded during the welding operation.

19. The method of welding a piece of metal across a joint between two plates, which consists in heating the piece of metal to a higher temperature than that of the plates and welding the strip to the plates while so heated.

WILLIAM LAWES COLE.